No. 862,850. PATENTED AUG. 6, 1907.
G. G. SCHROEDER.
DENATURED ALCOHOL GAS STUDENT LAMP.
APPLICATION FILED NOV. 7, 1906.

3 SHEETS—SHEET 3.

Inventor
George G. Schroeder

Witnesses

By
Attorney

THE NORRIS PETERS CO., WASHINGTON, D. C.

UNITED STATES PATENT OFFICE.

GEORGE G. SCHROEDER, OF WASHINGTON, DISTRICT OF COLUMBIA, ASSIGNOR TO INDUSTRIAL ALCOHOL HEAT AND LIGHT COMPANY, A CORPORATION OF SOUTH DAKOTA.

DENATURED-ALCOHOL-GAS STUDENT-LAMP.

No. 862,850.     Specification of Letters Patent.     Patented Aug. 6, 1907.

Application filed November 7, 1906. Serial No. 342,373.

*To all whom it may concern:*

Be it known that I, GEORGE G. SCHROEDER, a citizen of the United States, residing at Washington, in the District of Columbia, have invented certain new and useful Improvements in Denatured-Alcohol-Gas Student-Lamps, of which the following is a specification.

This invention has relation to denatured alcohol gas student lamps, and it consists in the novel construction and arrangement of its parts as hereinafter shown and described.

The object of the invention is to provide a lamp of the character as indicated, which is adapted to receive denatured alcohol as a fuel and convert the same into a gas. Means is also provided for mixing such gas with air and for conducting the resultant mixture to a mantle where the same is consumed and produces a bright light. Simple means is also provided for starting the lamp by the use of the fuel in its liquid state, and after the parts of the lamp are thoroughly heated the said starting means is dispensed with when the lamp gasifies and mixes the elements automatically.

The lamp consists primarily of a stand upon which is mounted a reservoir, a pipe connects said reservoir with a burner, the said burner being of special construction.

The burner consists of inner and outer cylinders spaced apart. The said supply pipe communicating with the space between the cylinders. The inner cylinder near its upper end is provided with a series of spray perforations, arranged preferably in a horizontal row, while the upper end of the inner cylinder is covered with a foraminous material. A mantle is arranged above the cylinders. The lower end of the inner cylinder is open for the admission of air, and the inner cylinder constitutes a mixing chamber. A starting pan is arranged about the lower portion of the outer cylinder, and the said outer cylinder forms the inner wall of the said starting pan. A pipe of small transverse diameter is connected with the supply pipe, and is arranged to deliver the liquid fuel by gravity into the starting pan. The said pipe is provided with a valve, as is also the main supply pipe.

Figure 1:
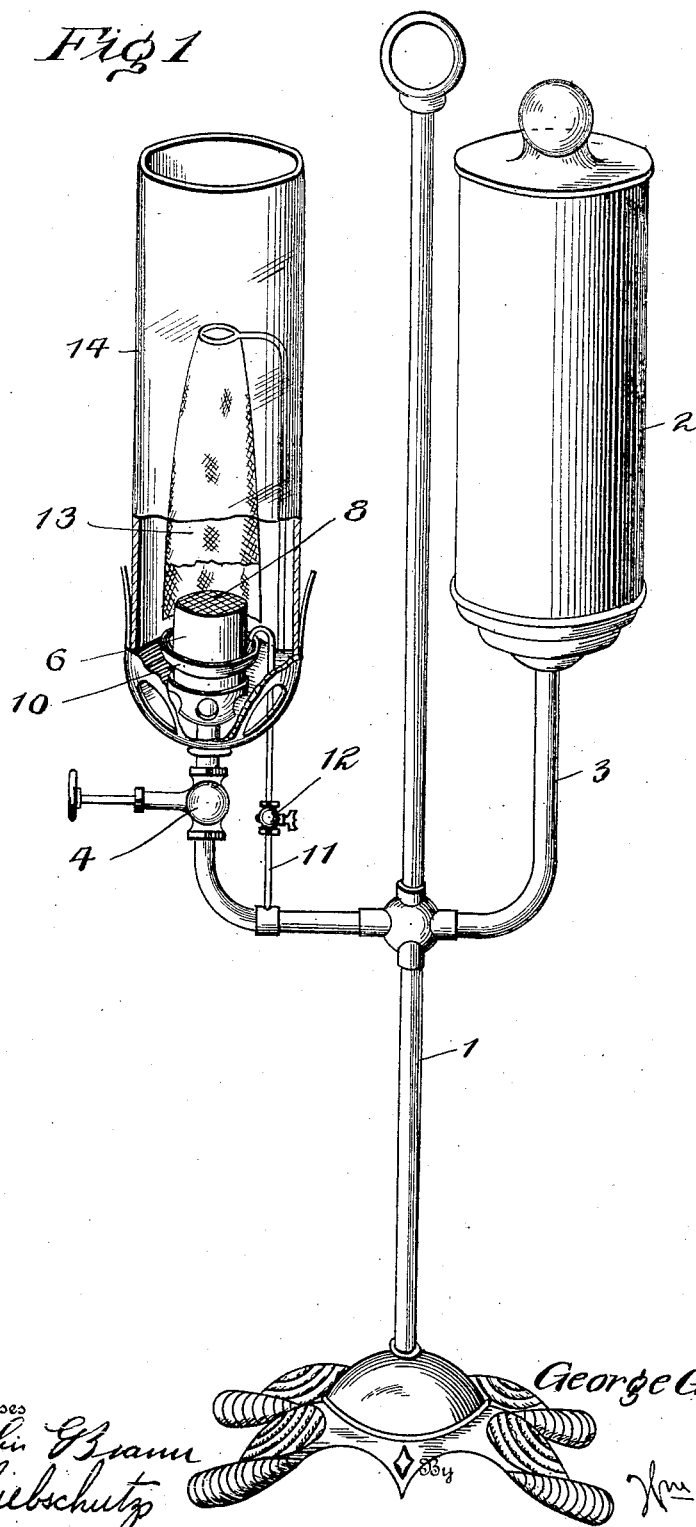
Figure 2:
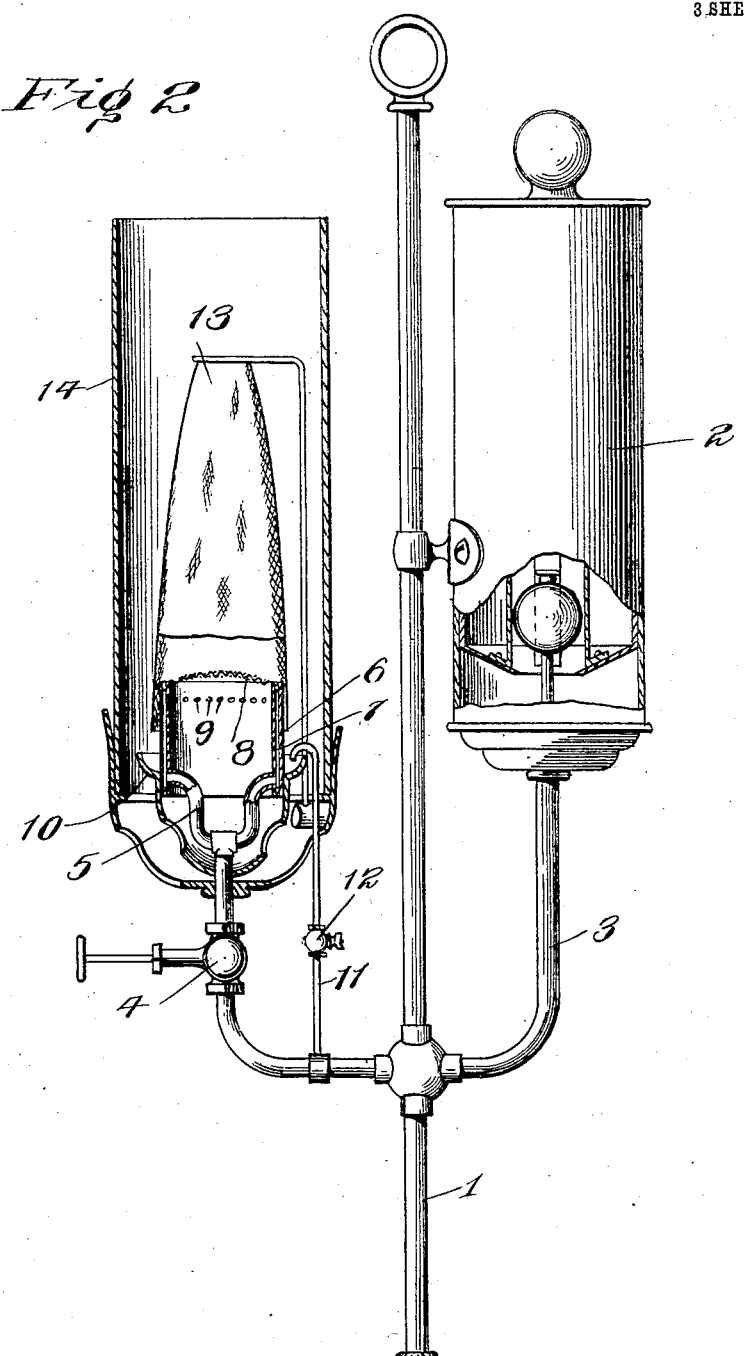
Figure 3:
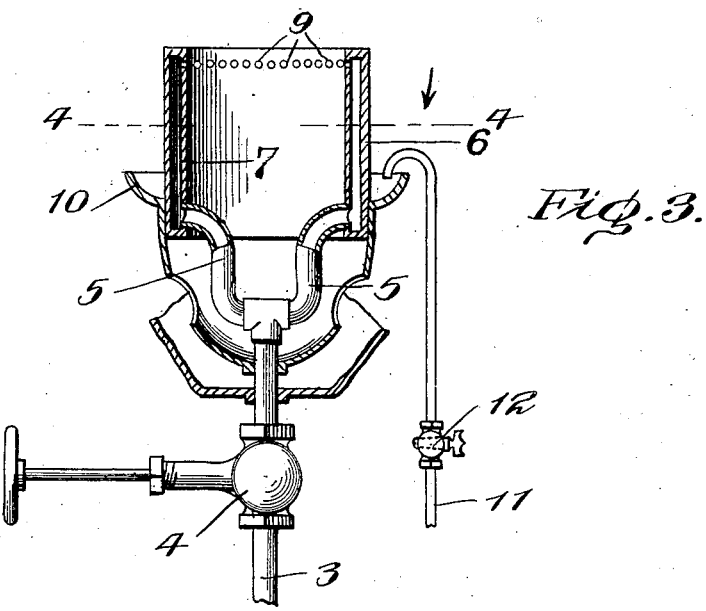
Figure 4:
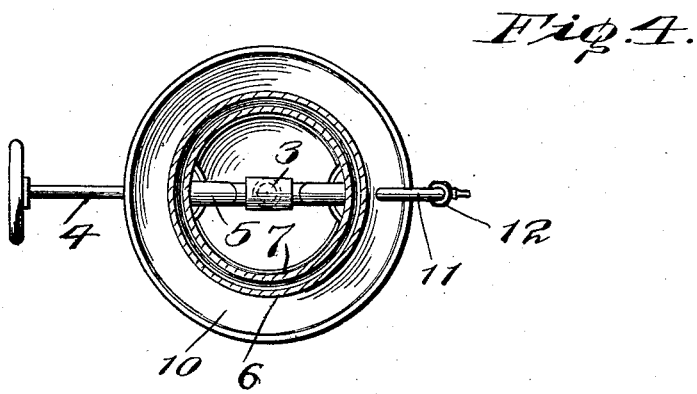

In the accompanying drawings:—Figure 1, is a perspective view of the lamp with parts broken away. Fig. 2, is a side elevation of the lamp with parts in section. Fig. 3, is a vertical sectional view of the burner, and:—Fig. 4, is a horizontal sectional view of the burner cut on the line 4—4 of Fig. 3.

This lamp comprises the stand 1, upon which is mounted the liquid fuel reservoir tank 2. Said tank is capable of vertical adjustment upon the stand 1, in the manner common to students lamps. The supply pipe 3, connects with the reservoir 2, and is provided at a point between its ends with the valve 4. The other end of the said pipe 3, is divided into a number of branches 5, 5.

The burner consists of the outer cylinder 6, and the inner cylinder 7, which are spaced apart. The inner cylinder is open at its upper and lower ends, and over its upper end is located the foraminous material 8. The inner and outer cylinders are united at their upper ends by suitable walls to form a closed annular vaporizing chamber surrounding the inner cylinder. The said inner cylinder is also provided near its upper end with a series of spray perforations 9, which are arranged in a horizontal row. The branches 5, 5, communicate with the space between the cylinders 6, and 7.

The starting pan comprises a casing surrounding the lower portion of the outer cylinder 6, and having air inlets in its bottom, the top edge being flared at 10 to form the starting pan, proper, the inner wall of the said pan being formed by the said outer cylinder. The reduced pipe 11 leads up from the pipe 3, and terminates above the edge of the starting pan 10. Said pipe 11 is provided with a valve 12. The mantle 13 is located above the cylinders 6 and 7, and the lower end of the said mantle receives the said cylinders. The chimney 14 surrounds the said mantle and the cylinders.

The operation of the lamp is as follows:—Liquid fuel of the character stated is placed in the reservoir 2. Said liquid flows by force of gravity from the said reservoir through the supply pipe 3. Before the lamp is lighted the valve 4 is closed, and the valve 12 is opened. Thus the liquid passes up through the pipe and enters the starting pan 10. The liquid in the said starting pan is then ignited. The heat from the flame heats the cylinders 6 and 7, and adjacent parts of the burner. When the said parts are sufficiently heated, the valve 12 is closed, and the valve 4 is opened. The liquid then passes up into the branches 5, 5, of the pipe 3. The said branches having become heated, the liquid begins to vaporize, and when it enters the space between the cylinders 6 and 7, said vapor is converted into gas. The gas thus formed is sprayed by its own compression through the perforations 9, and is mixed with air coming up through the lower end of the inner cylinder 7. As the mixture passes through the foraminous material 8 it is separated into fine streams, thus effecting a more complete commingling of the air and gas. The mixture then passes to the meshes of the mantle 13, where it is ignited and produces a brilliant illumination. In order to put the light out, the valve 4 is closed.

It will thus be seen that a simple and effective means is provided for converting denatured alcohol into a highly efficient and brilliant illuminant, and that the means is easy of operation and is attended with no danger.

Having described my invention, what I claim as new and desire to secure by Letters Patent is:—

1. In a lamp of the character described, a burner formed with an outer vaporizing chamber and a central combustion chamber, a cup-like casing embracing the exterior wall of said burner and closing the lower end of said combustion chamber, said casing being provided with air inlet perforations, the upper edge of said casing being flared to form a starting pan, and means for supplying hydrocarbon to said vaporizing chamber.

2. In a lamp of the character described, a burner formed with an outer vaporizing chamber and a central combustion chamber, a cup-like casing embracing the exterior wall of said burner and closing the lower end of said combustion chamber, said casing being provided with air inlet perforations, the upper edge of said casing being flared to form a starting pan, and a feed pipe passing through said casing and communicating with said vaporizing chamber.

3. In a lamp of the character described, a burner formed with an outer vaporizing chamber and a central combustion chamber, a cup-like casing embracing the exterior wall of said burner and closing the lower end of said combustion chamber, said casing being provided with air inlet perforations, the upper edge of said casing being flared to form a starting pan, and a feed pipe passed through said casing and provided with branches located in said combustion chamber and communicating with said vaporizing chamber.

4. In a lamp of the character described, a gas generating burner comprising a casing formed of two concentric walls joined at their upper and lower edges to form a closed vaporizing chamber and a central combustion chamber, the inner wall being provided with vapor outlets leading to said combustion chamber, a casing surrounding the outer wall of said burner and provided with air openings, the upper edge of the last mentioned casing being flared to form a starting pan, and means for supplying hydrocarbon to said vaporizing chamber and said starting pan.

5. In a lamp of the character described, a gas generating burner comprising a casing formed of two concentric walls joined at their upper and lower edges to form a closed vaporizing chamber and a central combustion chamber, the inner wall being provided with vapor outlets leading to said combustion chamber, a casing surrounding the outer wall of said burner and provided with air openings, the upper edge of the last mentioned casing being flared to form a starting pan, and a feed pipe passed through the last mentioned casing and provided with branches projected into said combustion chamber and communicating with said vaporizing chamber.

6. In a lamp of the character described, a gas generating burner comprising a casing formed of two concentric walls joined at their upper and lower edges to form a closed vaporizing chamber surrounding a central combustion chamber, the inner wall being provided with vapor outlets leading to said combustion chamber, a reservoir, a supply pipe leading therefrom to said vaporizing chamber, and means for regulating the supply from said reservoir.

In testimony whereof I have signed my name to this specification in the presence of two subscribing witnesses.

GEORGE G. SCHROEDER.

Witnesses:
BERLIN G. BRAUN,
C. L. MILLARD.